(12) United States Patent
Stein et al.

(10) Patent No.: US 6,322,860 B1
(45) Date of Patent: Nov. 27, 2001

(54) PLASTIC SUBSTRATES FOR ELECTRONIC DISPLAY APPLICATIONS

(75) Inventors: Alan Daniel Stein, Groton, MA (US); Michael Paul Hallden-Abberton, Maple Glen, PA (US); Audrey Brenda Liss, Newton, PA (US); Steven David Fields, Yardley, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/183,987

(22) Filed: Nov. 2, 1998

(51) Int. Cl.$^7$ ...................................................... B32B 3/02
(52) U.S. Cl. ........................... 428/1.26; 428/1.1; 428/1.2; 428/1.21; 428/1.4; 428/1.6; 349/56; 349/158
(58) Field of Search ....................... 349/158, 56; 428/1.1, 428/1.2, 1.21, 1.23, 1.26, 1.4, 1.6, 273.5

(56) References Cited

U.S. PATENT DOCUMENTS

| | | | |
|---|---|---|---|
| 1,631,805 | 6/1927 | Ferngren | 65/53 |
| 1,753,768 | 4/1930 | Blair | 65/195 |
| 1,772,448 | 8/1930 | Allen | 65/195 |
| 1,829,641 | 10/1931 | Ferngren | 65/195 |
| 1,836,394 | 12/1931 | Reece | 65/53 |
| 1,841,579 | 1/1932 | Fraser | 65/53 |
| 1,872,550 | 8/1932 | Allen | 65/195 |
| 1,891,371 | 12/1932 | Danner | 65/53 |
| 1,891,373 | 12/1932 | Danner | 65/92 |
| 3,149,949 | 9/1964 | Dockerty et al. | 65/53 |
| 3,451,798 | 6/1969 | Simon | 65/199 |
| 3,537,834 | 11/1970 | Simon | 65/199 |
| 4,727,117 | * 2/1988 | Hallden-Abberton et al. | 525/343 |
| 4,802,742 | 2/1989 | Ichikawa et al. | 350/339 R |
| 5,022,737 | * 6/1991 | Yamamotto et al. | 350/96.29 |
| 5,076,987 | 12/1991 | Wank et al. | 264/210.2 |
| 5,084,517 | * 1/1992 | Hallden-Abberton | 525/183 |
| 5,149,481 | 9/1992 | Gross et al. | 264/210.2 |
| 5,242,742 | 9/1993 | Funk et al. | 428/215 |
| 5,286,436 | 2/1994 | Funk et al. | 264/210.2 |
| 5,776,641 | * 7/1998 | Roberts et al. | 430/7 |
| 5,911,899 | * 6/1999 | Yoshikai et al. | 219/522 |
| 6,183,829 | * 2/2001 | Daecher et al. | 428/64.1 |

FOREIGN PATENT DOCUMENTS

| | | |
|---|---|---|
| 0 145 355 A2 | 6/1985 | (EP) . |
| 0 232 795 A2 | 8/1987 | (EP) . |
| 0 234 726 A2 | 9/1987 | (EP) . |
| 0 318 197 A2 | 5/1989 | (EP) . |
| 0 570 135 A2 | 11/1993 | (EP) . |
| 0 770 899 A1 | 2/1997 | (EP) . |
| WO 92/04386 | 3/1992 | (WO) . |

* cited by examiner

Primary Examiner—Blaine Copenheaver
Assistant Examiner—Alicia Chevalier
(74) Attorney, Agent, or Firm—S. Matthew Cairns; Darryl F. Frickey; John L. Lemanowicz (57) ABSTRACT

Disclosed is the use of certain polyglutarimides as plastic substrates for use in electronic display applications. These substrates have relatively high Tgs for plastics, and good optical clarity and flatness, with low shrinkage and low birefringence. Also disclosed are electronic display cells made using such polyglutarimide substrates.

19 Claims, 2 Drawing Sheets

PLASTIC SUBSTRATES FOR ELECTRONIC DISPLAY APPLICATIONS

BACKGROUND OF THE INVENTION

The present invention relates to plastic substrates. In particular, the present invention relates to the use of polyglutarimides as substrates for electronic display applications.

Electronic displays are devices used to exhibit electronically generated graphical and textual images. There are many different types of electronic displays, and many more are being developed. Among the more familiar types of electronic displays are: liquid crystal displays ("LCDs"); cathode ray tubes ("CRTs"); arrays of light-emitting diodes ("LEDs"); plasma display panels ("PDP"); field emission displays ("FED"); and electroluminescent ("EL") displays. As electronics become more and more miniaturized, there has been an increased demand for portable devices. LCDs and EL displays are particularly useful in such portable electronic devices due to their light weight and low power consumption relative to other display technologies.

The basic LCD unit is a cell made of two transparent sheets (referred to in the art as substrates) having conductive coatings, wherein the coated sheets are sandwiched together along the edge with an adhesive cell-sealing material and filled with liquid crystal and spacers. Additional components which may be included in a liquid crystal display cell include, for example, alignment layers used to align the liquid crystal fluid, color filter coatings, active electronic devices such as thin film transistors, and polarizers. EL displays are generally composed of at least one transparent substrate having a conductive coating, and make use of electroluminescent phosphors as the image generating medium. Electronic devices made with these types of displays include other electronic components, such as drivers, which are used to generate the image on the electronic display.

Substrates for display devices have typically been made of optical quality glass or quartz because these materials meet requirements for optical clarity and flatness, and because these materials have good gas and moisture barrier properties and good thermal and chemical resistance. On the other hand, glass and quartz are brittle and subject to breakage, and they are therefore limited in usefulness in thin sheets or films less than 1 mm in thickness.

Various plastics have been proposed as replacement substrates because they are lighter weight, may be formed into thinner sheets or even films, and are more resistant to breakage. High temperature plastics (those having Tg of at least 150° C.) are preferred in order to provide adequate thermal stability during the display manufacturing process. Such materials include, for example, thermoplastic resins such as polyacrylates, polysulfones, polycarbonates and polyimides.

U.S. Pat. No. 4,802,742 (Ichikawa et al) describes the use of certain plastics, such as polyether sulfone and polycarbonate, as plastic substrate materials for LCDs. Polyether sulfone has a Tg of 220° C. and is therefore preferred over other plastics for use as substrate material; however, this resin has an amber color, and is therefore limited in application to thin films. Polycarbonate has less color and a higher white light transmission than polyether sulfone, but its Tg (150° C.) is undesirably low, and it has relatively high stress-optic coefficient (resulting in higher birefringence).

Electronic displays made with these types of plastic substrate materials have been under development for about 20 years, but they have enjoyed only limited commercial success because all of these plastics have limitations which interfere with their performance as substrate materials. These limitations include unsatisfactory: optical quality, flatness, solvent resistance, thermal resistance, and gas barrier properties. Coatings have typically been used to improve some of these deficiencies in the plastic substrates.

EP 770 899 A1 (Paczkowski) discloses a method and composite for double sided processing of plastic substrates useful as plates in liquid crystal displays such that the composite can be separated after processing to form both sides of a liquid crystal cell. The focus of this application is on a method of simultaneously processing two pieces of plastic substrate to minimize the differences in processing conditions between the two plates which form the sides of the LCD cell. There is no discussion in this application of selection of substrate materials except with regard to UV absorption of the material and there is no discussion of coatings for the substrate other than ITO.

There remains a need for a plastic substrate material which has good optical quality, flatness, solvent resistance, thermal resistance, and gas barrier properties.

STATEMENT OF THE INVENTION

The present invention is directed to a plastic substrate for electronic display applications, including a polyglutarimide sheet of 25 mm or less having Tg of at least 150° C.; total white light transmission of at least 88%; and a shrinkage of no more than 0.1%. This substrate further includes optional layers coated on the polyglutarimide sheet, such layers selected independently from crosslinked coatings, barrier coatings, and clear conductive coatings.

The present invention is also directed to a polyglutarimide having an imidization level of at least 95% and an acid level of no more than 1 wt %.

DETAILED DESCRIPTION OF THE INVENTION

As used in this specification, the following terms have the following definitions, unless the context clearly indicates otherwise. "Glass transition temperature" or "Tg" is the midpoint of the narrow temperature range over which polymers change from being relatively hard and brittle to relatively soft and viscous (rubbery). "Plastic" refers to polymer, such as thermoplastic polymers, which can form sheets. The terms "polymer" and "resin" are used interchangeably throughout the specification, and the terms "polyglutarimide" and "imidized acrylic" are used interchangeably. "Sheet" refers to a sheet having a thickness of about 25 mm or less, and is intended to include "films" (sheets having thickness of <0.5 mm). "Shrinkage" refers to an irreversible dimensional change that occurs in a sheet subjected to a heat-cool cycle. The use of the term "(meth)" with reference to "acrylate" is meant to include either methacrylate or acrylate. The following abbreviations are used in the specification: cm=centimeter(s); mm=millimeter(s); nm=nanometer(s); $\mu$=micron(s) (micrometers); Å=Angstrom(s) ($10^{-10}$ meters); g=gram(s); meq/g= millequivalents per gram; mL=milliliters; Pa=Pascals; kPa= kiloPascals; Pa-s=Pascal-seconds; sec=second(s), min= minute(s); hrs=hour(s); wt %=percent by weight; UV=ultraviolet; IR=infrared; PMMA= polymethylmethacrylate; and ITO=indium-tin oxide. All temperature references are ° C. unless otherwise specified. Ranges specified are to be read as inclusive, unless specifically identified otherwise.

Polyglutarimides of the present invention include those described in U.S. Pat. Nos. 4,727,117 (Hallden-Abberton et al.), 4,246,374 (Kopchik), 3,284,425 (Schröder et al.), and 5,073,606 (Sasaki et. al.). The disclosures of these patents are incorporated herein by reference to the extent they teach preparation of polyglutarimides. Although the details of such reactions will not be provided herein, all of these methods for preparing polyglutarimides involve high temperature reactions of PMMA with amines.

The polyglutarimide resins of the present invention with high Tg, high stability at processing temperatures, and high light transmission also forms sheets and films with low birefringence, which makes it particularly suited to applications that require a high use temperature optical quality sheet or film.

In preparing the polyglutarimides of the present invention, the degree of imidization can be increased by increasing the reaction time or temperature. In principle, it is possible to increase the imidization level to 100%; however, as a practical matter, as the imidization level approaches 100%, the reaction slows considerably and the polymer begins to degrade before full imidization can be achieved.

It has now surprisingly been found that if the degree of imidization on the polyglutarimides are greater than 95%, the resultant materials have much higher Tgs with little to no decrease in light transmission, have much better thermal stability, and have much less bubble formation during processing.

In general, when polyimides of approximately 95% imidization level are prepared, the remaining non-imide groups are largely in the form of methacrylic acid groups or their amine salts; therefore, for example, a 95% imidization level polyimide derived from $CH_3NH_2$ and PMMA, is actually a copolymer of roughly 95% imide groups and 5% acid groups (of which a portion can be in the form of mono-, di-, or tri-methylammonium methacrylate salts). The presence of these salts can be confirmed, for instance, by exchange-neutralization of these salts with a stronger base than the amine (such as KOH or NaOH). The amines released during titration with KOH can then be detected by gas chromatography, for instance.

It has now unexpectedly been found that even small amounts of acid and acid-amine salts (about 0.3 wt %) can have a large deleterious effect on sheet quality at high processing temperatures, giving rise to enough bubble or streak formation to make an uniform and defect-free optical sheet difficult to prepare.

In theory, it should be possible to reduce the residual acid level in the polyimide polymer by increasing the level of imidization to nearly 100% (at which point the remaining acid group level should be 0%), such that the residual acid and acid salt level should equal the levels described below in Eq. 1. The line represented by Eq. 1 represents the acid levels (and therefore the compositions) disclosed in U.S. Pat. No. 3,284,425 and expected also in U.S. Pat. Nos. 4,246,374, or 5,073,606.

$$\text{Wt \% Acid Group Level}=100-(\text{wt \% Imidization Level}) \qquad \text{Eq. 1}$$

However, the imidization reaction is a sequential-step reaction, proceeding through the acid group intermediate to final product (which also involves a degenerate rearrangement reaction to remove trapped groups from in-between imide groups) The result of this inherent reaction sequence, is that, as the acid group level decreases, the incremental imidization level also decreases (since it requires this precursor group to proceed), so that a 100% imidization level approaches infinite reaction times, making this approach impractical. Another limitation to achieving 100% imidization is that, as reaction time is lengthened, temperature is raised, or both, polymer degradation becomes significant (at about 99.7% imidization).

In contrast, the process of U.S. Pat. No. 4,727,117 has the ability to reduce acid level independently of imidization level by conversion of the acid groups to nonreactive groups ("capping"). In this disclosure, however, greater than 95% imidization levels at very low acid levels were not examined. The present invention, therefore discloses for the first time, polyimide compositions in the 95 to 99.7% imidization range having residual acid and/or acid salt levels which fall BELOW the line described in Eq. 1; that is the present invention discloses compositions which preferably obey the acid level/imidization level correlation described in Eq. 2.

$$(\text{Wt \% Acid Group Level}<100-(\text{Wt \% Imidization Level}) \qquad \text{Eq. 2}$$

More preferably, the residual acid levels should be less that 1.0 wt %, and most preferably less than or equal to 0.3 wt % acid level in the 95.0 to 99.7% imidization level.

Finally, it should be noted that measured percent nitrogen (%N) levels are usually used to determine wt % imidization by the relationship described in Eq. 3:

$$\text{Wt \% Imidization}=100 \cdot (\%N/K) \qquad \text{Eq. 3}$$

(The constant K in Eq. 3 will change depending on the amine used. The value of K for methyl amine is 8.377%.) This makes the assumption that all nitrogen is in the form of cyclic imide. However, when amine-acid salts are present, they add nitrogen which is not in the form of imide.

The following example serves to illustrate the problem. When a typical highly imidized sample according to the process of U.S. Pat. No. 4,246,374 was made, a nitrogen level of 8.307% was measured which predicted a % imidization level of 99.2 wt %. However, when this material was titrated, it showed 0.436 meq/g acidity. This is consistent with the following composition, 96.3% imide, 1.7% methacrylic acid, and 2.0% monomethylamine salt of methacrylic acid (about 3.7% combined acid groups). Therefore, it is easily possible to achieve a %N level of 8.4% and still have greater than 1 wt % acid groups remaining. Even though the %N value can therefore lead to slightly imprecise imidization levels, we retain the previous definition of % imidization as calculated from Eq. 3 since most of the previous literature has been defined this way. However, when another polyglutarimide similar to the above example was prepared according to the process of U.S. Pat. No. 4,727,117 and titrated, a residual acid level of 0.00 to 0.08 wt % was measured, with a nitrogen level of 8.11% (96.8% imide, 3.12–3.04% MMA, 0.00–0.08% MAA). This polyimide was exceptionally suitable for extrusion into a substantially void-free optically quality sheet, especially by the method of the "overflow" process, discussed below.

The polyglutarimide material used in forming the substrates of the present invention may be formulated with additives to provide performance advantages and custom properties. Such additives include, for example, antioxidants, UV absorbers, UV stabilizers, fluorescent or absorbing dyes, anti-static additives, release agents, fillers and particulates. The type and amount of additive used for particular purposes are known to those skilled in the plastic arts and will not be further detailed herein.

Optical quality polyglutarimide sheets of the present invention can be made in accordance with any of several methods known to those skilled in the art, including, but not limited to: solvent casting, compression molding, extrusion, calendering and press-polishing, and post-production stretching or annealing. The preferred method of making the polyglutarimide sheets of the present invention is by a modified extrusion process which utilizes an overflow die to form a molten "web" which when cooled is a plastic sheet having the desired characteristics of low birefringence, low shrinkage, good flatness and good optical clarity. Such a process and apparatus are disclosed in a co-pending application entitled "Process and Apparatus for Forming Plastic Sheet" filed on the same date as the present application. For ease of reference, this process will be referred to herein as the "overflow" process.

Figure 1A:
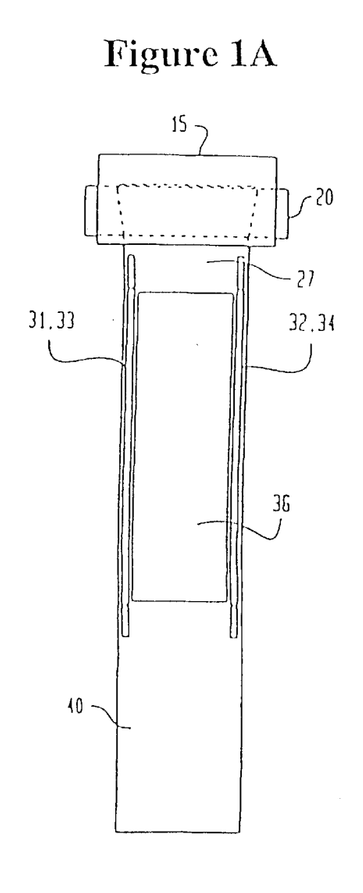
FIG. 1A is a frontal view of a typical "overflow" process apparatus.
Figure 1B:
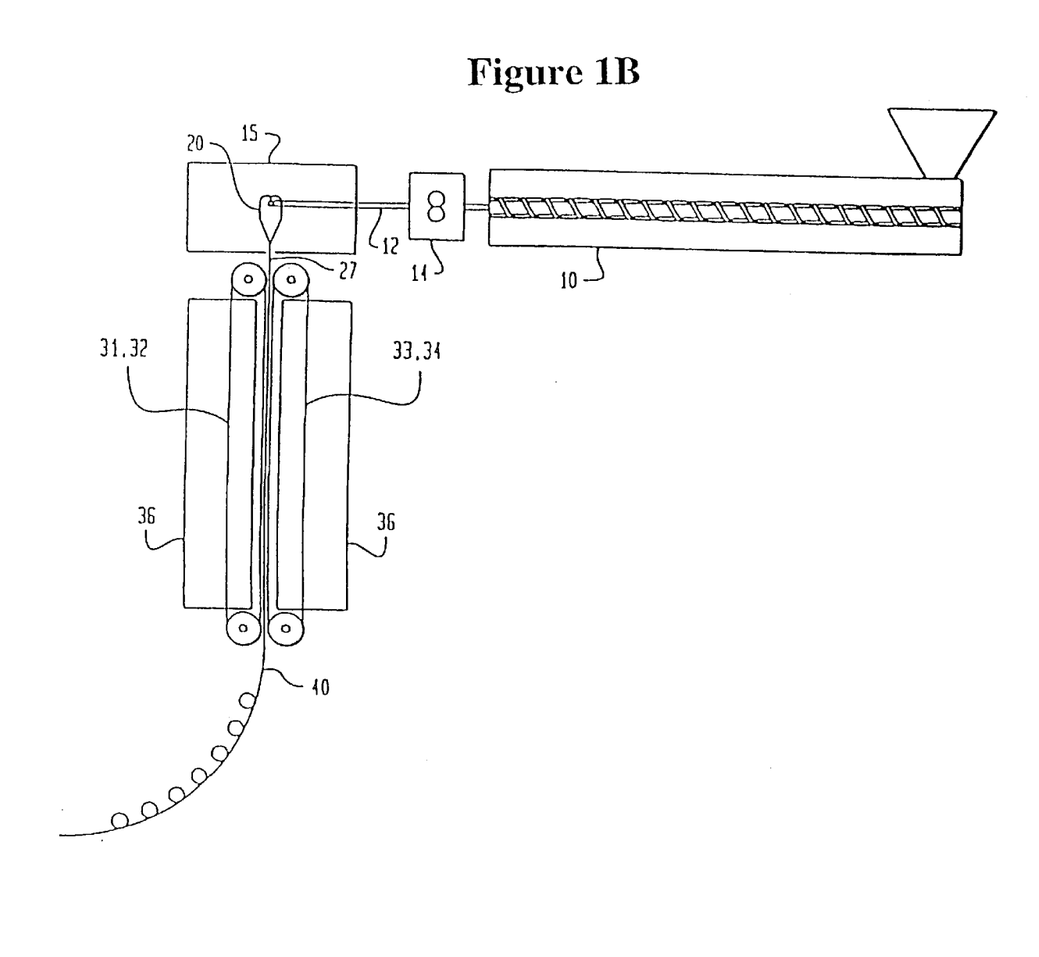
FIG. 1B is a side view of the apparatus of FIG. 1A.

Referring to FIGS. 1A and 1B, a typical apparatus for the "overflow" process is described herein. Molten polymer from a source 10 is delivered to an overflow die 20 via channel 12, where it is introduced to the die 20 through the conduit opening to the conduit. The temperature of the molten polymer as it is delivered to die 20 is maintained by use of heaters 15 located in close proximity to die 20. As the molten polymer fills the die opening, it is forced out through the metering arrangement, onto the die lips, and flows out around the sides of the die 20. At the apex of the die 20, the molten polymer flowing from the sides converge to form the beginning of molten web 27. The molten web 27 is picked up at its edges by two pairs of tank treads 31, 32, 33 and 34 which guide the molten web away from die 20. As molten web 27 is guided away from die 20, the temperature of the web gradually falls below the glass transition temperature of the polymer, and results in cooled sheet 40.

The glutarimide substrate sheets (referred to in this specification as "base sheets") of the present invention will generally have a thickness of 25 mm or less with a thickness variation over a 400 mm length of 10% or less. It is preferred that the base sheet thickness is $\leq 5$ mm, and most preferably $\leq 1$ mm. Other parameters useful in characterizing the base sheets of the present invention include, for example, sheet waviness, sheet roughness, shrinkage, and birefringence.

Sheet waviness and roughness may be measured with a stylus profiler. Sheet waviness (Wy) is the difference between maximum and minimum values in a profile, filtered with a 8 mm long wavelength cutoff, over a 20 mm sampling length. For the base sheets of the present invention, Wy should be $\leq 1.0\mu$, preferably $\leq 0.2\mu$, and most preferably $\leq 0.05\mu$.

For a roughness measurement the surface profile is filtered with a Gaussian long wavelength cutoff of 0.08 mm and a short wavelength cutoff of 0.0025 mm. The evaluation length is 0.4 mm. The roughness parameter (Rq) is the root mean square average deviation of the filtered profile from a mean line. For the base sheets of the present invention, Rq should be $\leq 50$ nm, preferably $\leq 10$ nm and most preferably $\leq 5$ nm.

As used in this specification, shrinkage is defined as the percentage change in length of a sample before and after heating, given a heating temperature relative to Tg and a length of time for which the sample is heated. For the base sheets of the present invention subject to heating to a temperature 20 degrees below the Tg for 4 hours, the shrinkage should be $\leq 0.1\%$, preferably $\leq 0.05\%$, and most preferably $\leq 0.01\%$.

Optical retardance refers to the phase retardation that occurs for light polarized along one optical axis relative to light polarized along a second, orthogonal axis, when light passes through a birefringent material. Birefringence is the difference in the index of refraction along two perpendicular optical axes. Birefringence ($\Delta$n) of a material is related to optical retardance (OR) by Eq. 4, where t is the thickness of the material.

$$OR = \Delta n \cdot t \qquad \text{Eq.4}$$

For the base sheets of the present invention, the retardance should be $\leq 20$ nm, preferably $\leq 10$ nm, and most preferably, $\leq 5$ nm.

In a preferred embodiment of the present invention, the plastic substrate includes one or more coatings (collectively referred to herein as the "coating package"). While the glutarimide sheet of the present invention has good flatness and optical clarity, and low birefringence and shrinkage, other properties can be improved by the application or one or more coatings capable of imparting such improved characteristics. Properties which can be affected include but are not limited to: hardness, scratch resistance, chemical or solvent resistance, adhesion of a coating layer to the plastic substrate, adhesion between layers of different types of coatings, environmental stability, gas and moisture barrier properties, and light transmission. Proper selection of coatings and their relative placement are important, and are dictated by the properties of the base sheet one wishes to improve, interactions of coatings with the base sheet, the interactions among coating layers, and the cost of the coatings.

The coating package for the substrate of the present invention includes at least one coating layer. Different types of coating layers which may be utilized in the present invention, and methods for their application, are described below. In referring to the relative placement of the coating, "interior" or "inside" means closer to the plastic base sheet, and "exterior" or "outside" means further from the plastic base sheet.

A. Crosslinked Coating Layer

A crosslinked coating layer may improve solvent resistance, abrasion resistance, and may promote adhesion between the plastic substrate and a subsequent coating layer (for example, between an organic and an inorganic coating). Crosslinked coating layers, if used, may be applied to one or both sides of the plastic substrate.

In general, a crosslinked coating layer has a thickness of 0.1 to 25$\mu$, preferably 0.5 to 10$\mu$, and more preferably 1 to 5$\mu$. The crosslinkable coating is preferably applied by one or more coating methods known in the art, and then cured. Examples of coating methods known in the art includes: spin coating, dip coating, rod coating, knife coating, blade coating, air-knife coating, gravure coating, forward and reverse roll coating, slot coating, extrusion coating, slide coating, and curtain coating. Suitable methods are described by E. D. Cohen and E. B. Gutoff (eds) in *Modern Coating and Drying Technology* (VCH Publishers, New York: 1992).

The crosslinked coating layer may be formed from one or more polymers, monomers, or a combination of one or more polymers, monomers, or reactive oligomers which are applied to the surface of the plastic sheet, then treated to effect polymerization.

Polymers useful in forming the crosslinked coating layer include but are not limited to: acrylate homopolymers and copolymers, methacrylate homopolymers and copolymers, acrylic polymers containing silicon monomers, silicone polymers, polyurethanes, and epoxy resins. Specific examples of polymers useful in forming the crosslinked coating layer include: poly(methylmethacrylate/ methacryloxypropyl trimethoxysilane), copolymers of methacrylate and multifunctional (meth)acrylate monomers, poly(styrene/multifunctional comonomer) copolymers, poly (styrene/acrylonitrile/multifunctional comonomer), and copolymers of methyl methacrylate and alpha-methylstyrene with multifunctional comonomers.

The above polymers and copolymers can also be used in conjunction with multifunctional comonomers and/or particulate mixtures, especially when the polymers are soluble in the comonomer(s). Towards this end, low molecular weight polymers with reactive end groups or pendant groups are often used, and sometimes referred to as "oligomers." A cosolvent may also be used to solubilize or disperse the mixture.

Multifunctional conmonomers are known to those skilled in the polymer arts, and include but are not limited to styrene and (meth)acrylate type comonomers. Multifunctional (meth)acrylate comonomers can often be polymerized to give crosslinked coatings useful for modification of the substrate surface. The following are examples of multifunctional (meth)acrylic comonomers useful in the formation of crosslinked coating layers: diacrylates and methacrylates which include, for instance, 1,6-hexanediol diacrylate, 1,4-butanediol diacrylate, 1,4-butanediol dimethacrylate, tripropyleneglycol diacrylate, ethylene glycoldiacrylate, and bisphenol-A dimethacrylate; triacrylates, including monomers such as trimethylolpropane triacrylate, and tetraacrylates, including pentaerythritol tetracrylate, hexaacrylates, such as dipentaerythritol hexacrylate. Also useful are hydroxyalkylacrylates and hydroxyalkylmetacrylates, which include for example hydroxymethylacrylate, hydroxyethylmethacrylate, hydroxypropylacrylate, hydroxypropylmethacrylate, and so forth.

Examples of polyethylenically unsaturated monomers useful as crosslinkers include: allyl methacrylate; dicyclopentenyl acrylate and methacrylate, glycidyl methacrylate; glycidyl acrylate; acrylate and methacrylate esters of neopentyl glycol such as monodicyclopentenyl ether, epoxy-containing acrylates and methacrylates; divinyl benzene and dicyclopentenyloxyethyl acrylate and methacrylate.

Additional monomers useful in forming the crosslinked coating layer include but are not limited to: 4γ-glicidyloxypropyltrimethoxysilane; γ-glicidyloxypropyldimethoxysilane, dipentaerythritol pentaacrylate tetraethyleneglycol diacrylate, γ-methacryloxypropyltrimethoxysilane, dipentaerythritol hexaacrylate, tetrahydrofurfural acrylate, succinic acid-trimethylolethane-acrylic acid condensate, 3-[(2-aminoethyl)amino]propyltrimethoxysilane, hexamethyldisilazane, trimethoxymethylsilane, triethoxymethylsilane, phthalic anhydride, β-(3,4-epoxycylohexyl)ethyltrimethoxysilane, glycidyl methacrylate, phenyltriethoxysilane. All of these monomers and oligomers may additionally be used with colloidal silica or silica ($SiO_2$) formed by deposition from silica orthoesters (such as $Si(OCH_2CH_3)_4$), and/or colloidal metal oxides.

Examples of photopolymerization initiators which may be used with these Comonomers include: benzoin, benzoin methyl ether, benzoin isobutylether, 2,2-dimethoxy-2-phenyl benzoate, methyl-o-benzoyl benzoate, 2,2-dimethoxy-2-phenyl-acetyl-phenone, 2-hydroxy-2-methyl-1-phenyl-propan-1-one, benzophenone. Thermal initiators which may be used with these comonomers include peroxides, peroxycarbonates, azo initiators, nitroxides, and multifunctional initiators.

Polyurethane coatings may also be employed. These coatings are the product of reaction of a diol and a diisocyanate. Examples of diols include polypropylene glycol and 1,4-butanediol. Examples of diisocyanates include isophenone diisocyanate, tolylene diisocyanate, and 4,4'-methylene-bis-phenyl isocyanate. These comonomers or oligomers may also be capped with an acrylic monomer, such as 2-hydroxyethylacrylate or methacrylate, and reacted with multifunctional acrylates or methacrylates, or combinations thereof.

Melamine-type crosslinked coatings may also be useful. These cured polymers are formed from the reaction of melamine (triaminotriazine) and formaldehyde, imino-melamine formaldehyde resins, benzoguanimine formaldehyde resins, glycoluril-formaldehyde resins, and urea-formaldehyde resins.

In addition, non-crosslinked polymeric layers may be added for surface modification, adhesion, or compatibilization purposes. Such polymers include, for example, polymethylmethacrylate, polystyrene, polycarbonate, polyarylate, polyvinylidene fluoride, polyphenyleneoxide, polysulfone, polyetheretherketone, polyetherimide, polyvinylbutyral, polydimethoxysilane, and polyvinylacetate.

The polymer may be in liquid or molten form, and can be used neat or in a solvent. Crosslinking is accomplished after the polymer is applied to the plastic sheet. If a monomer is used to form a coating, the monomer may be in a solvent. Polymerization is then accomplished in situ. Crosslinking or polymerization (collectively referred to herein as "curing") may be accomplished by method such as, for example, heating or exposure to UV light. The time and temperature used for thermal curing a coating depends on the temperature limitations of the base sheet as well as the composition of the coating. The procedure used, and the wavelength required for UV curing, will depend upon the composition of the coating, but generally a broad wavelength ultraviolet lamp source may be used.

If more than one crosslinked coating layer is used, one may function as an anchor coating, on the interior of the coating package, while another may function as a topcoat, on the exterior of the base sheet and coating package. A topcoat may provide improved properties to the substrate, such as, for example: chemical resistance, abrasion resistance, leveling of non-uniformities in the surface of the plastic sheet. In the alternative, a temporary layer, such as a polyester or polyethylene film, may be applied to a partially coated substrate in order to handle the article (for example, during shipment) without harming the surface of the substrate, and may be removed prior to subsequent processing steps.

The following is an example of one procedure for applying a crosslinked polymeric coating. It will be recognized by those skilled in the art that other methods of application may be utilized. A coating composition is filtered to remove particles larger than 0.5 to 1.0μ. The composition is applied to a pre-cleaned plastic sheet in a clean, dust-free environment with controlled humidity and temperature. An example of a suitable clean environment is a laminar flow hood.

The coating composition is applied by one of the coating methods listed herein above. Dip coating is a convenient method for coating individual sheets. In a dip coating process, the rate at which the sheet is withdrawn and the viscosity of the composition during application are adjusted to produce a final coating thickness of 1 to 5μ. If a solvent is present, the coating may be allowed to dry at room temperature to allow the solvent to evaporate.

If the coating composition requires heat to cure, the coating may be cured in a convection oven. The cure time depends upon the temperature and the composition of the coating, but typical cure times and temperatures will range from 85° C. for 4 hrs to 170° C. for 10 min. For example, if a thermosetting silicone coating resin such as Silvue 100 (SDC Coatings Inc., Anaheim, Calif.) is cured at 85° C., the cure time may be 4 hrs, and if this same coating resin is cured at 125° C., the cure time may be 1 hr. If the coating composition, such as silicone-functional-acrylate XF-1142 (SDC Coatings Inc., Anaheim, Calif.), requires UV light to cure the coating may be cured using a lamp that supplies light of 250 to 350 nm wavelength. An example of such a lamp is a medium pressure mercury lamp, having a minimum energy of 150 milli-Joules per square centimeter ("mJ/cm$^2$"). The time required for curing depends upon the energy of the lamp; the greater the energy, the less cure time needed. For example, XF-1142 may be cured at a speed of about 5 meters per min under a focused beam of 118 Watts per cm.

If adhesion of a coating to the plastic sheet or to another coating must be improved, a primer coating or other surface preparation technique may be used between the plastic and the coating. Primers are typically used to improve the adhesion and durability of a coating. A primer may be a solution of one or more polymers or smaller molecules. In the alternative, a primer may be a solvent which is corrosive to the plastic sheet. If a solution is used, it is preferred that the solution is filtered to remove particles larger than 1.0μ, more preferably less than 0.5μ. A primer may be applied by a coating method such as flow coating, dip coating, or spray coating. A primer is typically applied in a 0.05 to 0.5μ layer. An example of a commercially available primer, used to promote the adhesion of silicone hard coatings to acrylic and polycarbonate plastics is SHP 401 Primer (GE Silicones, Waterford, N.Y.). After application, the primer coating is typically dried in air until tack-free, and may be further dried in an oven. An alternative method for improving the adhesion of a coating to a plastic substrate is a plasma treatment such as, for example, corona treatment, described by F. Garbassi et al. in *Polymer Surfaces, from Physics to Technology* (Wiley and Sons, New York: 1994). One or more additional crosslinkable coatings may then be applied as described above. Adhesion promotion may also be achieved by using reactive coupling agents. Examples of reactive coupling agents include γ-aminopropyltrimethoxysilane and trimethoxysilylpropyl methacrylate.

Plasma deposition may also be used to apply crosslinked coatings such as carbon coatings, including diamond like coatings, or fluorocarbon coatings. A plasma polymer is not a conventional polymer, but is formed from molecules which are typically gaseous at room temperature, but which can be condensed on a surface and formed into a network. Plasma polymers include but are not limited to polymers formed from monomers such as: hydrocarbons such as methane; halocarbons such as perfluoroethane; and organosilicones such as hexamethyldisiloxane and tetramethylsilane. Plasma deposition and the application of plasma polymers are described by H. Biderman and Y. Osada in *Plasma Polymerization Processes* (Elsevier Science Publishers, Amsterdam: 1992).

B. Barrier Layer

A barrier layer is a coating which reduces gas or moisture permeation. The composition of a barrier layer may be organic, or inorganic. A barrier coating may also be useful as a solvent resistant coating if the material of the barrier coating is solvent resistant and can prevent or reduce significantly the migration of such solvent(s) to the plastic sheet. Barrier layers, if used, may be applied to one or both sides of the plastic sheet.

Materials useful in forming inorganic barrier layers include oxides and nitrides of metals such as silicon, titanium, and aluminum. Oxides and nitride; useful as inorganic barrier layers include but are not limited to: silicon dioxide, silicon monoxide, and other silicon oxides; silicon nitride; aluminum oxide; aluminum nitride; titanium dioxide; tin oxide; yttrium oxide; magnesium oxide; and mixtures thereof. Mixed oxides and nitrides, such as silicon oxynitride and aluminum oxynitride may also be used, as may be non-oxide materials such as silicon carbide. Also useful are composite materials formed by simultaneously depositing multiple metals, such as, for example, silicon dioxide and aluminum oxide. Multiple layers of these materials may also be useful as barrier films; for example, multilayers of silicon oxide and silicon nitride. Other classes of materials useful in forming inorganic coatings include sol-gel coatings, organic/inorganic hybrid materials, and ceramic oxides using polysilazane precursors or silica-filled polysilazane precursors. It is most preferred to use silicon oxynitride.

The composition and properties of the resulting barrier layer are determined by factors such as, for example, the structural orientation of the atoms in the inorganic material, density, morphology, the relative rates of deposition of different atomic species in the barrier layer, the relative proportions of atomic species present during deposition of the barrier layer. An inorganic film may applied by standard vacuum deposition techniques, such as, for example, evaporation, sputtering, chemical vapor deposition, physical vapor deposition, plasma deposition, ion plating, and plasma enhanced chemical vapor deposition. Methods that do not result in heating of the substrate above the Tg for the plastic sheet are preferred. Vacuum deposition processes for inorganic films are described by R. F. Bunshah (ed) in *Handbook of Deposition Technologies for Films and Coatings*, 2nd Edition (Noyes Publications, Park Ridge, N.J.: 1994).

Polymers are preferred as organic barrier layers. Polymers useful in forming an organic barrier layer for use in the present invention when oxygen barrier properties are desired include but are not limited to: polyvinyl alcohol; ethylene vinyl alcohol; halogenated polymers such as polyvinylidene fluoride and polyvinylidene chloride; and polyacrylonitrile and copolymers thereof. Polymers useful in forming an organic barrier layer for use in the present invention when water vapor barriers are desired include but are not limited to: halogenated polymers such as polychlorotrifluoroethylene, polyvinylidene chloride, polyvinylidenefluoride and copolymers thereof; polyacrylonitrile and copolymers thereof; nylon; copolymers of tetrafluoroethylene with cyclic perfluorovinylallyl ethers; fluorinated polyimides; polymers and copolymers of ethylene and cyclic olefins; and polymers and copolymers of norbornene monomer. Films formed by plasma polymerization, such as those previously described for the crosslinked coating layer may also be used as barrier materials.

An organic film may be applied in the form of a molten polymer or a polymer solution, by methods known to those skilled in the art, such as, for example: spin coating, dip coating, rod coating, knife coating, blade coating, air-knife coating, gravure coating, forward and reverse roll coating, slot coating, extrusion coating, slide coating, and roller coating. Roller coating techniques include well known methods such as meniscus coating, gravure coating, and kiss coating. Such coating techniques are described by E. D. Cohen and E. B. Gutoff (eds) in *Modern Coating and Drying Technology* (VCH Publishers, New York: 1992). In the alternative, a polymeric organic film coating may be applied to the plastic sheet by lamination of a film, or coextrusion of a polymeric material with the plastic sheet.

The properties of the barrier layer will affect the ultimate barrier properties of the plastic substrate. For example, the chemical composition of the barrier may affect oxygen permeation and water permeation. Defects in the film may adversely affect the barrier properties. For example, pinholes will affect the barrier properties of the film. The density of the film will also affect its barrier properties; a lower density may increase the gas permeability of the film. The thickness of the barrier layer may also affect the barrier properties. For example, when an inorganic barrier layer is used and an incomplete layer of the inorganic material is deposited, the barrier properties will be adversely affected.

C. Clear Conductive Layer

The substrate of the present invention may be coated with a conductive coating for use in optical displays. For example, if the substrate is to be used in a liquid crystal display (LCD), a conductive coating is required. The clear conductive layer, if used, is generally applied only to one side, the side which will be "inside" the LCD cell and closest to the liquid crystal.

Examples of materials useful as clear conductive coatings for substrates of the present invention useful in display applications such as those utilizing the method of the present invention include indium tin oxide (ITO), tin oxide ($SnO_2$), indium oxide ($In_2O_3$), zinc oxide (ZnO), cadmium oxide (CdO), cadmium tin oxide ($Cd_2SnO_4$), and mixtures thereof. In the alternative, a polymeric conductive coating such as, for example, polyaniline or polyvinylenephenylene, may be used. The conductive coatings may also contain various dopant atoms or molecules to increase conductivity. The required resistance of a conductive coating for a liquid crystal display depends upon the type of display to be made, but will typically have a resistance of $\leq 500$ ohms per square ("$\Omega/\square$"), preferably $\leq 100$ $\Omega/\square$, and more preferably $\leq 50$ $\Omega/\square$.

D. Color Filter Coatings

If desired, one or more color filter coatings may be incorporated into the coated substrate of the present invention. Preferably, the one or more color filter coatings are interior of the conductive coating relative to the base sheet. The optional one or more color filter coatings may be used with or without a topcoat. If a topcoat is present, it is preferred that the color filter coating be placed interior to the topcoat. In the alternative, the color filter coating may also function as the topcoat. A color filter coating may be, for example, a polymer containing a dye or pigment.

If more than one coating layer is used, there is no a priori order in which the coatings must be layered; however, a coating must adhere to adjacent coatings and to the plastic sheet itself. Moreover, the coated plastic sheet must itself have certain properties and these may dictate the coatings used or the order in which they are placed. For example, if the barrier coating is not resistant to chemical attack, if cannot be situated such that it is exposed to solvents that will attack it. In similar fashion, if a barrier coating does not adhere to the plastic sheet, then an anchor coating, such as one of the crosslinked coating layers, may be used between the plastic sheet and the barrier coating to improve adhesion.

Figure 2:
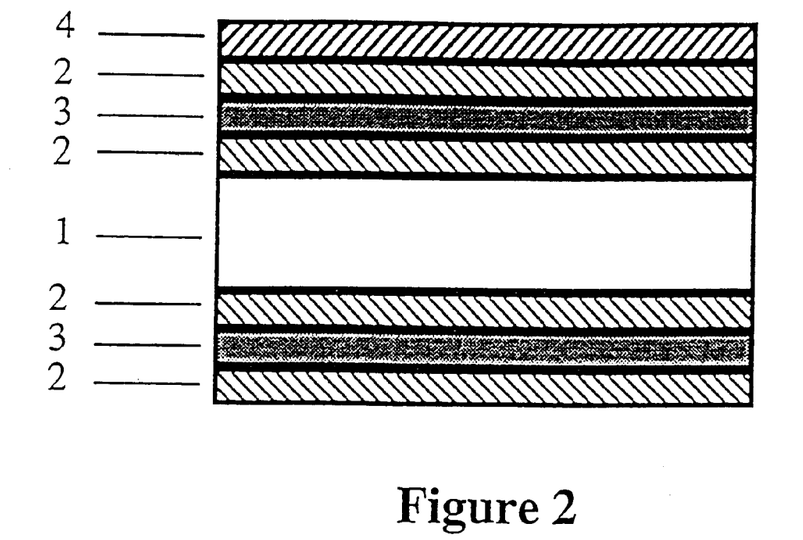
FIG. 2 is a schematic representation of a cross-sectional view of one embodiment of an electronic plate of the present invention.

In a preferred embodiment of the coated substrate of the present invention, as illustrated in FIG. 2, crosslinked coatings 2 are applied first to the plastic sheet 1 on both sides; inorganic gas barrier layers 3 are applied over the crosslinked coating layers 2; additional crosslinked layers 2 are applied over the gas barrier layers 3; and finally, a layer of ITO 4 is applied to one side of the coated substrate.

Figure 3:
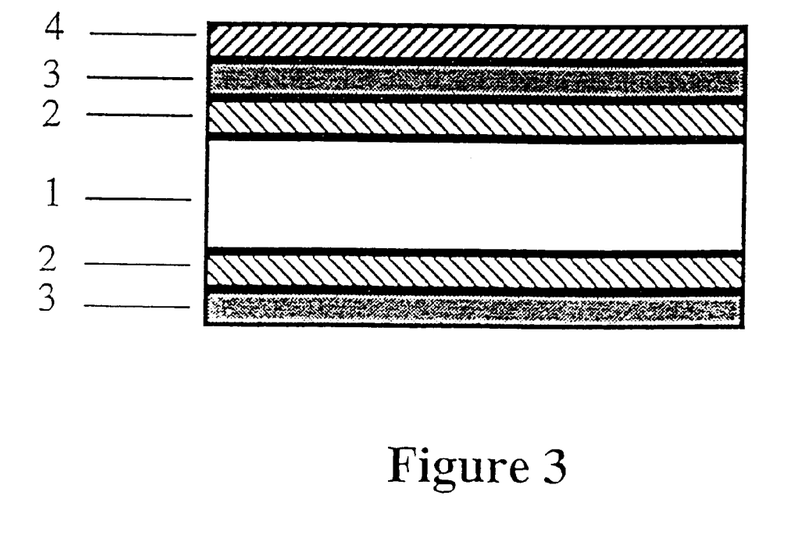
FIG. 3 is a schematic representation of a cross-sectional view of an alternate embodiment of an electronic plate of the present invention.

In another preferred embodiment, as illustrate in FIG. 3, crosslinked coatings 2 are applied to both sides of the plastic sheet 1; inorganic gas barrier coatings 3 are applied over the crosslinked coatings 2, and a layer of ITO 4 is applied to one side of the coated substrate.

Substrates of the present invention may be incorporated into a liquid crystal display cell by incorporating materials and processes similar to those by W. C. O'Mara in *Liquid Crystal Flat Panel Displays* (Van Nostrand Reinhold, New York: 1993). The process of forming a liquid crystal cell from substrates may include one or more of the following steps: patterning a clear conductive film on at least one substrate using a photolithographic process; applying a liquid crystal alignment material to the conductive coating on the two substrates; rubbing the alignment layers to impart the alignment characteristics to the substrates; applying spacer particles to at least one substrate; applying an edge seal to at least one substrate, contacting the two substrates in the proper orientation with conductive layers facing each other; curing the edge seal; injecting liquid crystal into the narrow gap formed between the substrates; and sealing the gap. The substrates of the present invention may be used in all types of liquid crystal display cells, including those types that incorporate a composite of liquid crystal and polymer.

The following examples are presented to illustrate further various aspects of the present invention, but are not intended to limit the scope of the invention in any respect.

EXAMPLE 1

Preparation of Polyglutarimides

Following are four examples of polyglutarimides useful as substrates in the present invention.

Plastic A

A polymer was made by the process taught in U.S. Pat. No. 4,727,117 using methyl amine as the imidization agent and anhydrous dimethyl carbonate as the re-esterification agent. Nitrogen content of the polymer was approximately 7.5 wt %. The residual acid content was 0.3 wt %. The Tg of the polymer was 155° C. The total light transmission of a 0.8 mm thick molded sheet was 92%.

Plastic B

A polymer was made by the process taught in U.S. Pat. No. 4,246,374 using ammonia as the imidization agent. Nitrogen content of the polymer was approximately 8.2% by weight. The Tg was 205° C. The total light transmission of a 1 mm thick molded sheet was 90%.

Plastic C

A polymer made by the process taught in U.S. Pat. No. 4,727,117 was prepared in two steps as follows:

Step 1: The imidization reaction was conducted by feeding a pelletized PMMA sample (Mw=134,000) at a rate of 110 g/min. to the feed zone of a 20 mm, counter-rotating, tangential, twin-screw extruder operating at 400 rpm. The polymer was conveyed through a feed zone 10.2 diameters long, operated at a set temperature of 165° C., and over a melt blister 3 cm long, into a pressurized reaction zone 63.0 diameters long, operated at a set temperature of 300° C., into which anhydrous monomethyl amine was introduced by pumping at a rate of 49 g/min at 7270 kPa at a point 5.7 diameters downstream from the end of the melt blister. The excess amine and gaseous by-products were removed through a pressure regulated valve set to 7270 kPa at a point 45 diameters downstream from the end of the melt blister. The resulting polymer was then conveyed over a second melt blister 7.6 cm long and into a 12.5 diameters-long devolatilization zone at 280–290° C. and 8.5 kPa pressure. The polymer at the end of the devolatilization zone was conveyed into a single screw, pumped out of a melt die, and briefly cooled in a water bath prior to being pelletized and collected. The polymer produced had a % N=level of 8.21% and a titration level of 0.436 meq/g (corresponding to a level of 3.75 wt % methacrylic acid), and Mw=108,000 (as measured by gel permeation chromatography). The collected polymeric glutarimide was next repassed through the same extruder and screw configuration as described above, except that dimethyl carbonate was added to the polymeric melt instead of methylamine as follows in Step 2.

Step 2: The methacrylic acid re-esterification reaction was conducted by feeding the pelletized polyimide at a rate of 90 g/min. to the feed zone of a 20 mm, counter-rotating, tangential, twin-screw extruder operating at 400 rpm. The polymer was conveyed into a reaction zone set to 300° C. as described above, into which anhydrous dimethyl carbonate was introduced by pumping at a rate of 9.0 g/min at 4650 kPa as described above. The excess dimethylcarbonate and gaseous by-products were removed at 4650 kPa as above. The resulting polymer was then conveyed over a second melt blister (7.6 cm long) and into a 12.5 diameters-long devolatilization zone at 280–300° C. and 8.5 kPa pressure. The polymer was collected in the same fashion as above and yielded a polymer which had a % N level of 8.11% and a titration level of 0.00–0.01 meq/g (corresponding to a level of 0.00–0.08% methacrylic acid).

EXAMPLE 2

Preparation of High Quality Polyglutarimide Substrate

Polyglutarimide resin (Mw=97,500; Tg of about 180° C.) was starve-fed into a 2 inch (5 cm) diameter single screw vented two-stage extruder having a 30:1 L:D ratio at a rate of 2.5 g/s using a gravimetric feeder. The extruder barrel had a temperature profile from 246° C. at the feed end to 329° C. at the discharge end. The resin was devolatilized using a devolatilization vent operating at 720–750 mm Hg. The screw was rotated at 30 rpm. A gear-type melt pump was used to pump the molten resin through a screen pack filter to 65 cm long overflow die with a 1.588 cm diameter internal conduit and a 40 cm long slot tapering from 0.965 to 1.067 mm. The melt pump temperature was 329° C. The melt pump suction pressure wag approximately 4100 kPa. The melt pump discharge pressure was approximately 1650 kPa. The die was heated using a hot oil system (oil temperature= 343° C.) via internal holes in the die, and the air around the die was heated with a forced-air oven (temperature=280° C.). The molten web formed at the apex of the die was conveyed using two pairs of tank treads operating at a speed of 1.2 cm/s, and cooled by natural convection of room air.

A 200 mm×200 mm piece was cut from the cooled sheet and tested. The resultant sheet had a thickness of 0.390 mm, with a variation of ±0.015 mm. The surface waviness Wy and Wq were <0.5µ and 0.18µ respectively, surface roughness Rq was 7.6 nm, and the optical retardance was <6 nm. The thermal shrinkage, measured at a temperature of 160° C., was 0.03% or less. The total light transmission was 92%, and the haze was 0.3%.

EXAMPLE 3

Preparation of Substrate Consisting of Polyglutarimide Sheet and Crosslinked Coating Layer The imidized acrylic plastic of Example 1A (Tg of 155° C.; refractive index of 1.54) was molded into a 0.8 mm thick, 10 cm×10 cm sheet by compression molding at 240° C. between polished chrome plates using a 0.8 mm spacer. The total white light transmission was 92%. The optical retardance of the sheet was <5 nm.

The plastic sheet was cleaned with isopropyl alcohol and dip coated with a solution formed from the reaction product of a multifunctional acrylate and an amino-organofunctional silane, and containing dispersed silica (Product XF-1142, SDC Coatings Inc; Anaheim, Calif.). The coating viscosity was approximately 10 centipoise. The withdrawal rate from the coating solution was 10 cm per min. The coating was cured by exposure to broad wavelength UV radiation by applying an energy density 250–360 milliJoules per square centimeter (mJ/cm$^2$). The resulting dry coating thickness was approximately 3µ as measured using a stylus profiler (Surfanalyzer System 5000, Federal Products; Providence, R.I.). The physical properties relevant to its use as a plastic substrate of a liquid crystal display are shown below in Table 1.

EXAMPLE 4

Preparation of Polyglutarimide Substrate with Crosslinked Coatings and Barrier Coatings A polyglutarimide plastic sheet of Example 1A was molded, coated, and cured in accordance with the procedures of Example 3. As in Example 3, the coating solution was formed from the reaction product of a multifunctional acrylate and an amino-organofunctional silane, and containing dispersed silica (Product XF-1146, SDC Coatings Inc; Anaheim, Calif.). A silicon oxynitride film was then deposited on both sides of the sheet by an ion beam sputtering process, according to the following procedure.

The plastic sheet surface was treated in an argon/oxygen plasma for about 30 min. An ion beam sputtered a silicon metal target in a pre-mixed atmosphere composed of argon (75% of gas pressure), oxygen (22%) and nitrogen (3%). The background pressure was $5\times10^{-5}$ torr. The total gas pressure was approximately $7\times10^{-4}$ torr. The film deposition rate was approximately 0.5 Å/second. The thickness of the coating was measured to be 600 Å (measured by transmission electron microscopy). The Si:O:N ratio of the deposited film was determined by x-ray photoelectron spectroscopy (XPS). The atomic ratio was measured to be Si:O:N 1:1.0:0.3.

The physical properties of the coated plastic are shown below in Table 1, and compared to coated plastic from Example 3.

EXAMPLE 5

Preparation of Polyglutarimide Substrate with Crosslinked Coatings and Barrier Coatings A silicon oxynitride film was deposited on both sides of a plastic sheet prepared according to Example 4 by an ion beam sputtering process, according to the following procedure.

The plastic sheet surface was treated in an argon/oxygen plasma for about 30 min. An ion beam sputtered a silicon metal target in a pre-mixed atmosphere composed of argon (75% of gas pressure), oxygen (22%) and nitrogen (3%). The background pressure was $5 \times 10^{-5}$ torr. The total gas pressure was approximately $7 \times 10^{-4}$ torr. The film deposition rate was approximately 0.5 Å/second. The thickness of the coating was measured to be 1000 Å (measured by transmission electron microscopy). The Si:O:N ratio of the deposited film was determined by x-ray photoelectron spectroscopy (XPS). The atomic ratio was measured to be Si:O:N 1:0.3:0.7.

The $SiO_{0.3}N_{0.7}$ coated plastic sheet was subsequently dipped into a silica filled alkoxysilane coating solution (Silvue 121, SDC Coatings Inc; Anaheim, Calif.). The viscosity of the coating solution was 10 centipoise. The sheet was withdrawn from the solution at a rate of 25 cm/min, and the coated plastic substrate was air dried at room temperature for 30 min. The coating resin was cured to a silsesquioxane coating by heating in a convection oven at 125° C. for 1 hour. The resulting silsesquioxane coating thickness was approximately $5\mu$.

Table 1 below shows the physical properties of the coated plastic from this Example 5, as compared to coated plastic from Examples 3 and 4 and uncoated plastic.

TABLE 1

Properties of Different Coated Plastics Compared with Uncoated Plastic

| Property | Example 1A | Example 3 | Example 4 | Example 5 |
|---|---|---|---|---|
| Total Light Transmission | 92% | 93% | 91% | 92% |
| Haze | ≦0.5% | ≦0.5% | ≦0.5% | ≦0.5% |
| Coating Adhesion | — | 100% resistant | 100% resistant | 100% resistant |
| Solvent Resistance | attacked by acetone, NMP, butyl acetate, gamma-butyrolactone | | | |
| $O_2$ Permeation (cc/$m^2$ · day · atm) | 3 | no improvement | 0.1 | 0.1 |
| $H_2O$ Vapor Permeation (g/$m^2$ · day · atm) | 3 | no improvement | 0.6* | 0.3 |
| Abrasion Resistance | abraded | no damage | no damage | no damage |
| Hardness | 2H | 3H | 3H | 3H |
| Maximum Use Temperature (° C.) | — | 135 | 135 | 135 |

*6 days

EXAMPLE 6

Application of Conductive Layer

Pieces of coated plastic from Examples 3 and 5, and a piece of uncoated plastic from Example 1A (for comparison purposes), were coated on one side with a transparent, conductive ITO film. The ITO film (indium:tin ratio was 10:1) was applied by DC magnetron sputtering from an ITO target (see, R. F. Bunshah (ed), *Handbook of Deposition Technologies for Films and Coatings,* 2nd Edition (Noyes Publications, Park Ridge, N.J.)). The ITO thickness was approximately 150 nm. ITO adhesion and surface resistivity, and the maximum use temperature, were tested. Properties are reported below in Table 2.

TABLE 2

Adhesion and Surface Resistivity of ITO Coated Plastic Sheets

| Property | Example 1A | Example 3 + ITO | Example 5 + ITO |
|---|---|---|---|
| ITO Adhesion (%) | 0 | 100 | 100 |
| ITO Surface Resistance (Ω/☐) | — | 54 | 50 |
| Maximum Use Temperature (° C.) | — | 135 | 125 |

EXAMPLE 7

Coated Polyglutarimide Substrate

The imidized acrylic plastic of Example 1B (Tg of 205° C.) was molded into a 1.0 mm thick sheet by compression molding between polished chrome plates at 250° C. The plastic sheet did not depolarize light when viewed between crossed polarizers. The plastic sheet was coated with a crosslinked coating, as in Example 3. The sheet was then coated with silicon oxynitride, then dipped into a silica filled alkoxysilane coating solution (Silvue 121, SDC Coatings, Inc; Anaheim, Calif.), and cured, as in Example 5.

Table 3, below shows the properties of the coated plastic as compared to the uncoated plastic.

TABLE 3

Comparison of Properties of Coated Plastic

| Property | Example 1B | Example 7 |
|---|---|---|
| Total Light Transmission | 90% | 88% |
| Haze (ASTM D-1003) | <0.5% | 0.8% |
| Solvent Resistance | attacked by acetone, NMP, butyl acetate, gamma-butyrolactone | resistant |
| $O_2$ Permeation (cc/$m^2$ · day · atm) | 0.1 | <0.1 |
| $H_2O$ Vapor Permeation (g/$m^2$ · day · atm) | 1.5 | 0.5 |
| Coating Adhesion | — | 100% |
| Abrasion Resistance | abraded | no damage |
| Hardness | ≦2H | 4H |
| Maximum Use Temperature (° C.) | — | 180 |

EXAMPLE 8

Coated Polyglutarimide Plastic Substrate

The imidized acrylic plastic of Example 1C (Tg of about 180° C.) was extruded into a 0.4 mm film using a 6.3 cm diameter, single screw, 2 stage extruder with a sheet die and polished rolls. The extruder barrel temperature were between 300 and 315° C., the die temperature was 280° C., and the roll temperature was 130° C. The roll speed was about 100 cm per min. The total light transmission of the 0.4 mm film was 92%.

The polyglutarimide film was coated on both sides as described in Example 4. The coated plastic was then coated on both sides with a silicon oxynitride film, according to the method described in Example 5. The target thickness of the silicon oxynitride film was 800 Å. The properties of the coated plastic film substrate are presented in the Table 4 below.

TABLE 4

Properties of Coated Plastic Film

| Property | Example 8 |
| --- | --- |
| Total Light Transmission | 90% |
| Haze | 0.6% |
| Solvent Resistance | no attack |
| Moisture Permeation Rate (g/m$^2$ · day) | 0.3 |
| Oxygen Permeation Rate (cc/m$^2$ · day · atm) | $\leq 0.2$ |
| Coating Adhesion | 100% |
| Abrasion Resistance | no damage |
| Maximum Use Temperature (° C.) | $\geq 160$ |

TEST METHODS

The following test methods were used to test the substrates made in the Examples above. It is understood in the art that these test methods are exemplary in nature, and that the results are not method-dependent.

Light Transmission

Total light transmission of the plastic sheets were measured using the method of ASTM D-1003 using a Gardner XL-211 Hazegard instrument (Pacific Scientific; Silver Spring, Md.). Haze measurements are made by the method of ASTM D-1003, Appendix X2 using the same instrument.

Refractive Index

Refractive index of the plastic sheets were determined by the method of ASTM D-542.

Optical Retardance

The retardance of light at 632.8 nm wavelength was determined in the following manner. A polarized laser beam (polarized at −45° with respect to the laboratory frame) was passed through the plastic sheet, and then through a photoelastic modulator ("PEM") (Model PEM-90, Hinds Instruments, Inc.; Hillsboro, Oreg.) oriented with optical axis set to 0° in the lab frame. The PEM voltage was set at ¼ wave retardance (158.2 nm). The light then was passed through a second linear polarizer (polarization axis +45°) and intensity detected by a silicon diode detector (Model PDA-50, ThorLabs Inc.; Newton, N.J.). The PEM and detector were modulated, and the signal from the detector processed by a lock-in amplifier (Model 5210, E G & G Princeton Applied Research; Princeton, N.J.). The plastic sheet was rotated perpendicular to the laser beam to find the maximum signal. The retardance was determined by comparing the maximum signal to that measured for a standard ¼ wave plate.

Glass Transition Temperature

The glass transition temperature of the plastic was determined by differential scanning calorimetry (Model DSC-7, Perkin-Elmer Corp., Norwalk, Conn.). Prior to testing, a 20 mg sample of each resin was pre-weighed. Each sample of plastic resin was pre-conditioned by heating to 20° C. above the estimated glass transition, held at that temperature for 1 minute, then cooled to room temperature. Heat capacity vs. temperature was recorded at a scan rate of 20° C. per minute. Tg values for commercially available plastics were taken from product literature.

Gas Permeation

Oxygen permeation was measured using an Oxtran 1000 instrument (Modern Controls, Inc.; Minneapolis, Minn.). The test procedure used was ASTM D-3985. The test gas was 100% oxygen with a relative humidity of 0%. The test temperature was 23° C.

Water vapor permeation was measured using a Permatran W600 instrument (Modern Controls, Inc.; Minneapolis, Minn.) The test procedure used was ASTM F-1249. The test temperature was 37° C. The test was run under 100% relative humidity. The measurements were determined at equilibrium, unless otherwise specified.

Nitrogen Content

Nitrogen content of imidized acrylic polymers was measured using a nitrogen analyzer (Carlo Erba Strumentazione NA 1500; Milan, Italy). In the instrument the plastic (0.1 g) was oxidized completely by flash combustion, then reduced with metallic copper to remove oxygen gas and to reduce all oxides of nitrogen to elemental nitrogen. Water and carbon dioxide were removed by filtration columns. Finally the nitrogen weight percent was determined with a thermal conductivity detector, using acetanilide ($C_8H_9NO$) standard (10.36% nitrogen).

Maximum Use Temperature

Coated plastics were heated to a given temperature for 30 minutes, cooled to room temperature, and inspected visually and with a microscope. Cracks in the coating, a change in coating appearance, roughening of the coating, or coating delamination were designated a failure. This procedure was repeated at increasing ten degree intervals until a failure was reported. The maximum temperature to which the plastic could be heated without failure is reported as the maximum use temperature.

Adhesion

Adhesion was determined by the method of ASTM D-3359. The percentage of the test area covered by the coating after the completion of the test was recorded. A value of 100% indicates complete adhesion.

Hardness

Hardness was determined by the "pencil hardness test." Pencils of varying degree of lead hardness (6B, softest, through 9H, hardest) were used. The hardest pencil was applied first. A pencil was held at 45° angle with respect to the substrate, and even and constant pressure was applied while the pencil was dragged across the surface. Pencils of decreasing hardness were subsequently used until a pencil that did not scratch the surface was found. The substrate hardness was reported as the hardness of the hardest pencil that did not scratch the surface.

Abrasion Resistance

Cheesecloth was rubbed over the surface of the sample for 100 strokes using a pressure of 100 g/cm$^2$. The surface of the substrate was visually examined for abrading and marring.

Solvent Resistance

Resistance to solvents was determined by immersing pieces of plastic and coated plastic at room temperature (23° C.) for 10 minutes. The solvents used were: isopropyl alcohol, deionized water, acetone, N-methylpyrrolidone, γ-butyrolactone, butyl acetate, 5% HCl, and E7 Liquid Crystal mixture (supplied by EM Industries, Hawthorne, N.Y.). Visual inspection of the condition of the surface of the plastic substrate was reported. If there was no apparent change after exposure to a particular solvent, the substrate was described as resistant to that solvent. If the surface was deformed, delaminated, roughened, cracked, or otherwise damaged, the substrate was reported to be attacked by that solvent.

ITO Sheet Resistance

The four-point probe technique was used to measure sheet resistance of conductive coatings. Four probe tips (osmium metal) were arranged linearly, spaced equidistant, and applied to the surface of the conductively coated plastic using uniform force. A current source was used to drive electrical current (I) through the outer two probe tips. The voltage drop (V) through the two inner probes were measured using a voltmeter. Sheet resistance was calculated using the formula:

$$Rs=(\pi/\ln 2)\cdot(V/I).$$

Titration Test (Wt % MAA)

The total titratable acidic functionality in the polymethacrylimides was determined by titration of a 0.15 g sample of polymer dissolved in 75 cc of 1:1 (v:v) methylene dichloride: methanol using 0.1 N alcoholic KOH as the titrant. (HPLC grade methylene dichloride supplied by JT Baker, and Omnisolv grade methanol supplies by EM Science.) Prior to titration, samples are dissolved by brief treatment in an ultrasonic bath, and an aliquot of 0.20 cc of 0.1 N aqueous HCl is added just before titration. To this stirred solution, 0.1 N KOH (in methanol) is added to the potentiometric end point using a VIT90 Titrator (Radiometer, Copenhagen) with a SAM90 titration cell containing a glass pH electrode (PHG201) and a calomel reference electrode with LiCl salt bridge solution (REF901), and ABU93 triburette apparatus. The meq/g value for MAA is calculated from A below:

$$[N]KOH\cdot[(\text{cc to end point, sample})-(\text{cc blank to end point, blank})]/\text{sample wt(g)} \qquad A$$

The wt % MAA values are calculated from B below:

$$\text{Wt \% MAA}=100[(\text{meq/g})\cdot 0.08609 \text{ g/meq}]=8.609 \text{ (meq/g)} \qquad B$$

The KOH solution is standardized based on a titration of dry potassium hydrogen phthalate.

What is claimed is:

1. A plastic substrate for electronic display applications, comprising a polyglutarimide sheet of 25 mm or less having a Tg of at least 150° C.; total white light transmission of at least 88%; and a shrinkage of no more than 0.1%; wherein the polyglutarimide sheet has a waviness of $\leq 1\mu$ in a profile over a 20 mm sampling length; and wherein the polyglutarimide sheet has an optical retardance of no more than 20 nm.

2. The substrate of claim 1, wherein the polyglutarimide sheet has a thickness of no more than 1 mm.

3. The substrate of claim 1, further comprising at least one layer of a crosslinked coating.

4. The substrate of claim 3, wherein the crosslinked coating comprises a polymer selected from the group selected from: acrylate homopolymers and copolymers, methacrylate homopolymers and copolymers, acrylic polymers containing silicon monomers, silicone polymers, polyurethanes, epoxy resins, and plasma-deposited polymers.

5. The substrate of claim 4, wherein the crosslinked coating comprises a homo- or co-polymer selected from the group consisting of (meth)acrylates and organofunctional alkoxysilanes.

6. The substrate of claim 5, wherein the crosslinked coating comprises a polymer selected from the group selected from: poly(methylmethacrylate/methacryloxypropyl trimethoxysilane), copolymers of (meth)acrylate and multifunctional (meth)acrylate monomers, poly(styrene/multifunctional comonomer) copolymers, poly(styrene/acrylonitrile/multifunctional comonomer), and copolymers of methyl methacrylate and alpha-methylstyrene with multifunctional comonomers.

7. The substrate of claim 1, further comprising at least one layer of a barrier coating.

8. The substrate of claim 7, wherein the barrier coating comprises an inorganic material selected from the group consisting of: metal oxide, metal nitride, metal oxynitride, silicon carbide, and mixtures thereof.

9. The substrate of claim 8, wherein the inorganic material is selected from the group consisting of: silicon dioxide; silicon monoxide; silicon oxides; silicon nitride; aluminum oxide; aluminum nitride; titanium dioxide; tin oxide; yttrium oxide; magnesium oxide; silicon oxynitride; aluminum oxynitride; silicon carbide; and mixtures thereof.

10. The substrate of claim 7, wherein the barrier coating comprises a polymer having gas or moisture resistance properties.

11. The substrate of claim 10, wherein the polymer having gas resistance properties is selected from the group consisting of: polyvinyl alcohol; ethylene vinyl alcohol; halogenated polymers; polyacrylonitrile and copolymers of polyacrylonitrile; and plasma polymers.

12. The substrate of claim 10, wherein the polymer having moisture resistance properties is selected from the group consisting of: halogenated polymers and copolymers; polyacrylonitrile and copolymers thereof; nylon; copolymers of tetrafluoroethylene with cyclic perfluorovinylallyl ethers; fluorinated polyimides; polymers and copolymers of ethylene and cyclic olefins; polymers and copolymers of norbornene monomer; and plasma polymers.

13. The substrate of claim 1, further comprising at least one layer of a color filter coating.

14. The substrate of claim 13, wherein the color filter coating comprises a polymer containing a dye or pigment.

15. The substrate of claim 1, further comprising at least one layer of a clear conductive coating.

16. The substrate of claim 15, wherein the clear conductive coating is selected from the group consisting of: indium tin oxide, tin oxide, indium oxide, zinc oxide, cadmium oxide, cadmium tin oxide, and mixtures thereof.

17. A plastic substrate for electronic display applications, comprising:

polyglutarimide sheet of 25 mm or less having a Tg of at least 150° C.; total white light transmission of at least 88%; and a shrinkage of no more than 0.1%; wherein the polyglutarimide sheet has a waviness of $\leq 1\mu$ in a profile over a 20 mm sampling length; and wherein the polyglutarimide sheet has an optical retardance of no more than 20 nm;

a layer of crosslinked coating disposed on either side of the polyglutarimide sheet; and a layer of a barrier coating disposed on each layer of crosslinked coating, exterior to the glutarimide sheet; and a layer of a clear conductive coating disposed on a layer of the barrier coating, exterior to the crosslinked coating.

18. The substrate of claim 17, wherein the crosslinked coating comprises a reaction product of a multifunctional acrylate with an organofunctional silane and containing dispersed silica; the barrier coating comprises silicon oxynitride; and the clear conductive coating comprises indium tin oxide.

19. A liquid crystal display cell useful in electronic display applications, comprising: two substrates, at least one of which is a substrate of claim 14, said substrates sandwiched together and sealed together at their edges wherein an interior space is created; and a layer of liquid crystal dispersed in the interior space formed between the two substrates.

* * * * *